United States Patent
Hirate et al.

(10) Patent No.: US 10,745,046 B2
(45) Date of Patent: Aug. 18, 2020

(54) STEERING ASSIST APPARATUS OF VEHICLE AND METHOD FOR STEERING ASSIST APPARATUS

(71) Applicant: DENSO CORPORATION, Kariya, Aichi-pref (JP)

(72) Inventors: Yosuke Hirate, Kariya (JP); Daiji Watanabe, Kariya (JP); Hisaya Akatsuka, Kariya (JP); Toshiya Kabayama, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 261 days.

(21) Appl. No.: 15/959,655

(22) Filed: Apr. 23, 2018

(65) Prior Publication Data

US 2018/0304922 A1 Oct. 25, 2018

(30) Foreign Application Priority Data

Apr. 24, 2017 (JP) ................................. 2017-084921

(51) Int. Cl.
| | | |
|---|---|---|
| B62D 6/00 | (2006.01) | |
| B62D 5/04 | (2006.01) | |
| B62D 15/02 | (2006.01) | |
| B62D 5/00 | (2006.01) | |
| G05D 1/02 | (2020.01) | |
| B62D 3/12 | (2006.01) | |

(52) U.S. Cl.
CPC ............ *B62D 6/003* (2013.01); *B62D 5/008* (2013.01); *B62D 5/0463* (2013.01); *B62D 6/007* (2013.01); *B62D 15/022* (2013.01); *B62D 15/025* (2013.01); *B62D 15/0285* (2013.01); *G05D 1/0212* (2013.01); *B62D 3/12* (2013.01)

(58) Field of Classification Search
CPC ...................................................... B62D 6/003
See application file for complete search history.

(56) References Cited

U.S. PATENT DOCUMENTS 6,050,359 A * 4/2000 Mouri .................... B62D 1/286
                                                                180/415
9,771,101 B2 * 9/2017 Mitsumoto ............ B62D 1/286
(Continued)

FOREIGN PATENT DOCUMENTS

JP 2015-137085 A 7/2015

*Primary Examiner* — Alex C Dunn
(74) *Attorney, Agent, or Firm* — Maschoff Brennan

(57) ABSTRACT

A steering assist apparatus is provided with a steering drive unit driving a steering apparatus, a steering control unit executing an automatic steering mode where a steering drive unit is controlled such that a turning angle is determined based on at least either a running state of the vehicle or road information to produce the determined turning angle, and a target differential angle control unit determining a target differential angle. The target differential angle control unit determines the target differential angle to be close to an automatic steering target differential angle used for the automatic steering mode, when input variation through a steering input apparatus is not detected during a transition period from a manual steering mode where the steering apparatus operates in response to the steering angle inputted through the steering input apparatus to the automatic steering mode or during an elapsed period after completing the transition period.

11 Claims, 6 Drawing Sheets

(56) References Cited

U.S. PATENT DOCUMENTS

| | | | |
|---|---|---|---|
| 10,173,725 B2* | 1/2019 | Heo | B62D 1/286 |
| 10,377,409 B2* | 8/2019 | Farhat | B62D 1/286 |
| 2012/0046817 A1* | 2/2012 | Kindo | B60W 30/143 |
| | | | 701/23 |
| 2012/0203430 A1* | 8/2012 | Shimada | B62D 6/007 |
| | | | 701/41 |
| 2015/0151786 A1* | 6/2015 | Fujii | B62D 6/008 |
| | | | 701/42 |
| 2015/0353125 A1* | 12/2015 | Tsubaki | B62D 1/286 |
| | | | 701/42 |
| 2016/0016606 A1* | 1/2016 | Tsubaki | B62D 6/002 |
| | | | 701/41 |
| 2017/0008557 A1 | 1/2017 | Mitsumoto | |
| 2017/0008577 A1 | 1/2017 | Mitsumoto | |
| 2017/0106903 A1* | 4/2017 | Moretti | B62D 1/286 |
| 2017/0174258 A1* | 6/2017 | Yamada | B62D 1/286 |
| 2018/0304920 A1* | 10/2018 | Hirate | B62D 6/003 |
| 2018/0304921 A1* | 10/2018 | Hirate | B62D 6/003 |

* cited by examiner

STEERING ASSIST APPARATUS OF VEHICLE AND METHOD FOR STEERING ASSIST APPARATUS

CROSS-REFERENCE TO RELATED APPLICATION

This application is based on and claims the benefit of priority from earlier Japanese Patent Application No. 2017-84921 filed Apr. 24, 2017, the description of which is incorporated herein by reference.

BACKGROUND

Technical Field

The present disclosure relates to a steering assist technique that controls a running locus of a vehicle.

Description of the Related Art

An automatic steering technique is known, in which a turning angle of a steering apparatus is controlled by using a running state of the own vehicle obtained by a detection apparatus such as radar apparatus and road information such as map information, without requiring an input from a steering as a steering input apparatus. When the driver operates the steering during the automatic steering operation, manual steering is activated, which allows the steering to operate in response to a given steering angle through the steering. For example, patent literature, JP-A-2015-137085 discloses the following technique. Since the differential angle between the steering angle and the turning angle is set to be different from each other between the automatic steering operation and the manual steering operation, the differential angle is offset when the steering operation is changed between the automatic and the manual. In this respect, to reduce the offset of the differential angle, the amount of the offset is controlled to be gradually smaller when the steering operation is changed to the manual steering mode from the automatic steering mode and the driver is operating the steering.

However, in the case where the amount of offset is cancelled or lowered when the driver is performing the steering operation, the differential angle changes regardless of the steering operation of the driver so that the driver feel discomfort.

Accordingly, it is preferably to remove or reduce discomfort to the driver and also mitigate or cancel the offset of differential angle, when the steering operation is changed to the automatic from the manual.

SUMMARY

The present disclosure has been achieved in light of the above-described circumstances and provides embodiments in the following aspects.

As a first aspect, a steering assist apparatus of a vehicle is provided, including a steering input apparatus and a steering apparatus, the steering input apparatus and the steering apparatus performing a differential operation with a differential angle in which a steering angle and a turning angle are determined. The steering assist apparatus according to the first aspect includes: a steering drive unit that drives the steering apparatus; a steering control unit that executes an automatic steering mode in which the steering drive unit is controlled such that a turning angle is determined based on at least either a running state of the vehicle or road information to produce the determined turning angle; and a target differential angle control unit that determines a target differential angle and controls the differential angle to be the determined target differential angle. The target differential angle control unit determines the target differential angle to be close to an automatic steering target differential angle used for the automatic steering mode, when input variation through the steering input apparatus is not detected during a transition period from a manual steering mode in which the steering apparatus operates in response to the steering angle inputted through the steering input apparatus to the automatic steering mode or during an elapsed period after completing the transition period.

According to the steering assist apparatus in the vehicle of the first aspect, since the target differential angle is determined to be close to an automatic steering target differential angle used for the automatic steering mode, when input variation through the steering input apparatus is not detected during the transition period from the manual steering mode to the automatic steering mode or during the elapsed period after completing the transition period, causing a feeling of discomfort to the driver can be avoided, or the feeling of discomfort can be reduced, and also the offset of differential angle can be mitigated or cancelled.

According to the steering assist apparatus in the vehicle of the second aspect, a method for controlling a steering assist of a vehicle is provided including a steering input apparatus and a steering apparatus, the steering input apparatus and the steering apparatus performing a differential operation with a transmission ratio which is a ratio of a change amount of a steering angle to a change amount of a turning angle. The method according to the second aspect includes steps of: determining a turning angle based on at least either a running state of the vehicle or road information; determining a transition from a manual steering mode in which the steering apparatus operates in response to the steering angle inputted through the steering input apparatus to an automatic steering mode in which a steering drive unit is controlled to produce the determined turning angle; and determining a target differential angle to be close to an automatic steering target differential angle used for the automatic steering mode, when input variation through the steering input apparatus is not detected during a transition period from the manual steering mode to the automatic steering mode or during an elapsed period after completing the transition period; and controlling the differential angle to be the target differential angle.

According to the second aspect of the method for controlling a steering assist of the vehicle, since the target differential angle is determined to be close to an automatic steering target differential angle used for the automatic steering mode, when input variation through the steering input apparatus is not detected during the transition period from the manual steering mode to the automatic steering mode or during the elapsed period after completing the transition period, causing a feeling of discomfort to the driver can be avoided, or the feeling of discomfort can be reduced, and also the offset of differential angle can be mitigated or cancelled.

DETAILED DESCRIPTION OF PREFERRED EMBODIMENTS

Hereinafter, a steering assist apparatus and a steering assist control method in a vehicle according to the present disclosure will be described in accordance with embodiments.

First Embodiment

Figure 1:
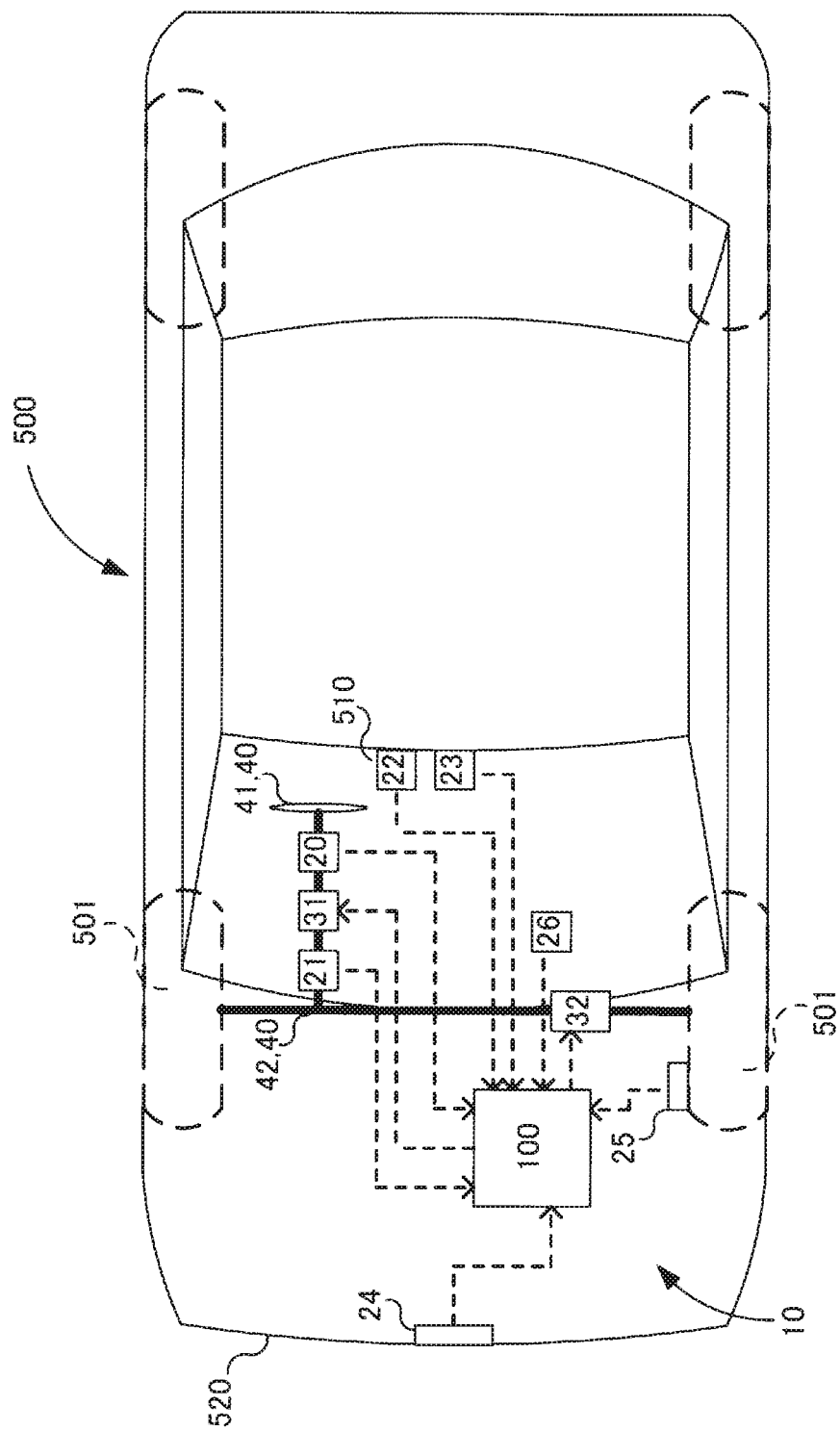
FIG. 1 is an explanatory diagram showing a vehicle in which a steering assist apparatus according to a first embodiment of the present disclosure is installed.

As shown in FIG. 1, a steering assist apparatus 10 according to the first embodiment is installed on a vehicle 500. The steering assist apparatus 10 is provided with a control unit 100, a rotational angle sensor 20 that detects a steering angle, a torque sensor 21, a front camera 22, a vehicle cabin camera 23, a millimeter wave radar device 24, a wheel speed sensor 25, a GPS 26, a variable steering angle apparatus 31 and a steering support apparatus 32. The vehicle 500 is provided with front wheels 501, a steering wheel 41 as a steering input apparatus, a steering mechanism 40 including a steering apparatus 42, a windshield 510, and a front bumper 520. Note that the vehicle may include, as a detection part that detects an object, at least the millimeter wave radar device 24, and may also include any one of the front camera 22, and a LIDAR (laser radar). Alternatively, a stereo camera may be provided instead of the millimeter wave radar device 24 or the millimeter wave radar device 24 together with a stereo camera may also be provided. According to the present embodiment, the front camera 22 and the millimeter wave radar device 24 are provided as the detection part.

Figure 2:
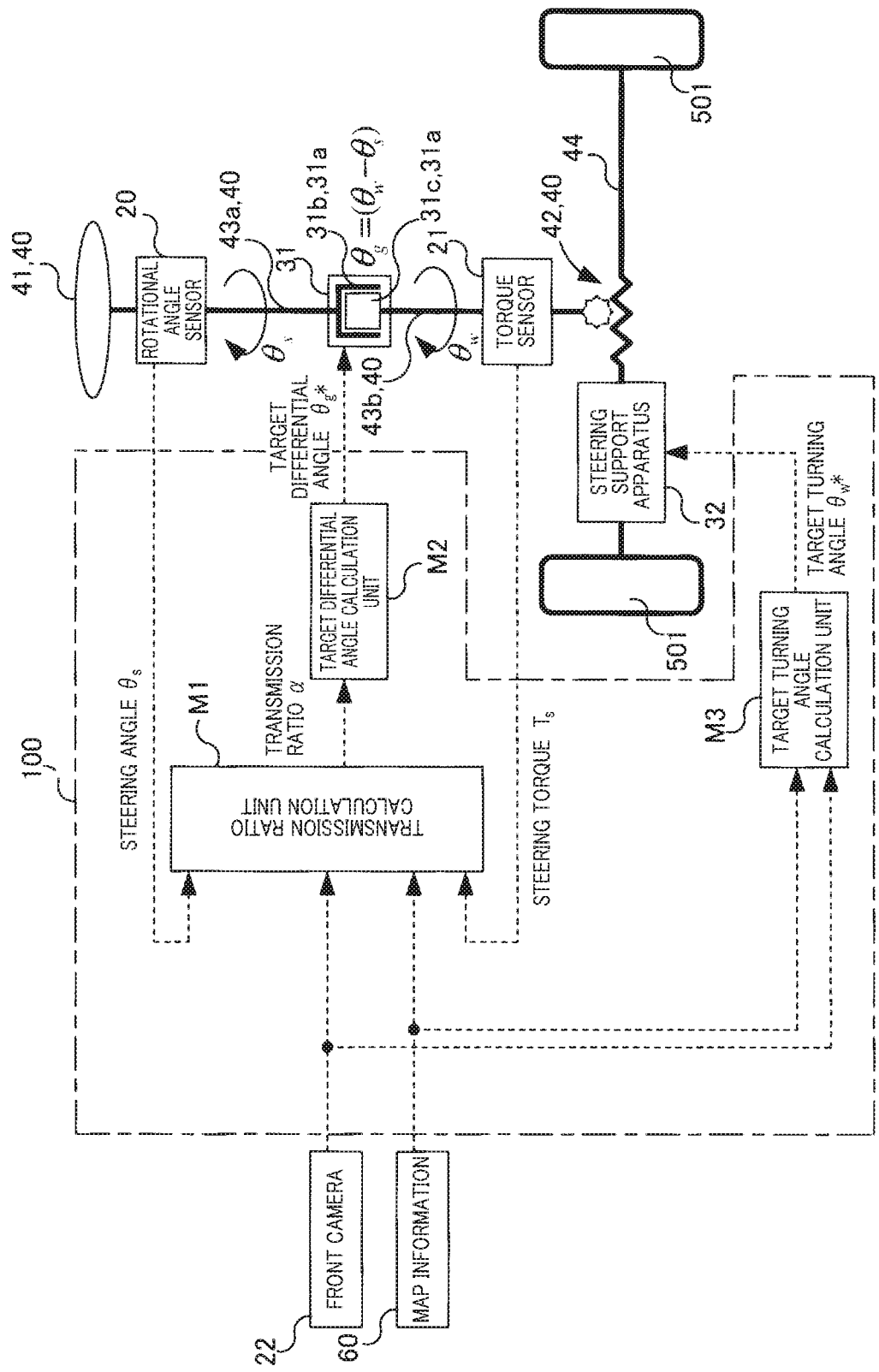
FIG. 2 is a functional block diagram showing an overall concept of a process executed by a control unit included in the steering assist apparatus according to the first embodiment.

As shown in FIG. 2, in the vehicle 500, the steering mechanism 40 is provided with the steering wheel 41 as a steering input apparatus to which the driver inputs a steering operation, the steering apparatus 42 that changes the turning angle of the front wheels 501, a steering shaft 43a and 43b that couples the steering wheel 41 and the steering apparatus 42, and a turning shaft 44 that couples the steering apparatus 42 and the front wheels 501. The wheel to be steered may be the rear wheel. According to the present embodiment, the vehicle includes the variable steering angle apparatus 31, and the steering shaft is configured of an upper steering shaft 43a that couples the steering wheel 41 and the variable steering angle apparatus 31, and a lower steering shaft 43b that couples the variable steering angle apparatus 31 and the steering apparatus 42. The rotational angle sensor 20 is provided to the upper steering shaft 43a, to detect a steering angle of the steering wheel 41, that is, the steering position of the steering wheel 41 as a rotational angle of the upper steering shaft 43a. The torque sensor 21 is provided to the lower steering shaft 43b, which detects the rotational torque of the lower steering shaft 43b as the steering force.

The steering apparatus 42 is a rack-and-pinion type apparatus, including a pinion gear disposed at a tip end of the lower steering shaft 43b, that is, an end portion opposite to an end portion connected to the variable steering angle apparatus 31, and a rack gear provided to the tuning shaft 44. The rack and pinion gear mechanism converts the rotary motion of the lower steering shaft 43b to motion in the axis direction of the turning shaft 44 (i.e., linear motion) to drive the turning shaft 44 in the axial direction, whereby the front wheels 501 are steered with a desired turning angle.

The variable steering angle apparatus 31 continuously and variably generates a differential angle between the rotation angle of the input shaft and the rotation angle of the output shaft. The variable steering angle apparatus 31 includes a motor 31a and a motor control unit which is not shown. The motor 31a is, for example, a brushless DC motor, in which a housing having a stator 31b fixed thereto is connected to the upper steering shaft 43a, and the output shaft having the same axis as the rotor 31c of the motor 31a is coupled to the lower steering shaft 43b via a reduction speed mechanism which is not shown. Hence, a differential angle $\theta g=(\theta w-\theta s)$ is present between the steering angle $\theta s$ and the turning angle $\theta w$, which is uniquely determined by a reduction ratio of the reduction speed mechanism. In other words, when the steering apparatus accepts steering input corresponding to the steering angle $\theta s$ via the steering wheel 41, the steering apparatus 42 operates with the turning angle $\theta w$ where the differential angle $\theta g$ is added to the steering angle $\theta s$. Since the variable steering angle apparatus 31 is provided with the motor 31a, a relative angle between the housing and the output shaft is variable so that the differential angle $\theta g$ between the steering angle of the steering wheel 41 and the turning angle of the steering apparatus 42 is also continuously variable. As the reduction speed mechanism, a planetary gear mechanism or a wave motion gear mechanism are used. In the case where the torque of the motor 31a is sufficiently high, the reduction speed mechanism is not necessarily provided. Further, when a steer-by-wire mechanism is used, which requires no physical connection between the upper steering shaft 43a and the lower steering shaft 43b, the reduction speed mechanism is unnecessary.

The steering support apparatus 32 is provided with a motor which is not shown and a motor control unit. The output shaft of the motor has a pinion gear at a tip end of the output shaft of the motor, and a reduction speed mechanism at the tip end of the motor if necessary. The pinion gear of the steering support apparatus 32 meshes with a rack gear provided to the turning shaft 44, whereby the turning shaft 44 is driven by the motor torque. Therefore, the steering support apparatus 32 corresponds to a steering drive unit that drives the steering apparatus 42. The steering drive unit drives the steering apparatus 42 via the steering shaft 44 without the steering force of the driver which is transmitted from the steering wheel 41, thereby producing desired turning of the front wheels 501. Note that the steering support apparatus 32 can be also used as a steering force support apparatus that supports the steering force transmitted from the steering wheel 41. Further, the steering support apparatus 32 may include a configuration in which a motor is disposed on the same axis as the steering shaft 44, or the steering support apparatus 32 may be integrated to the steering apparatus 42.

Figure 3:
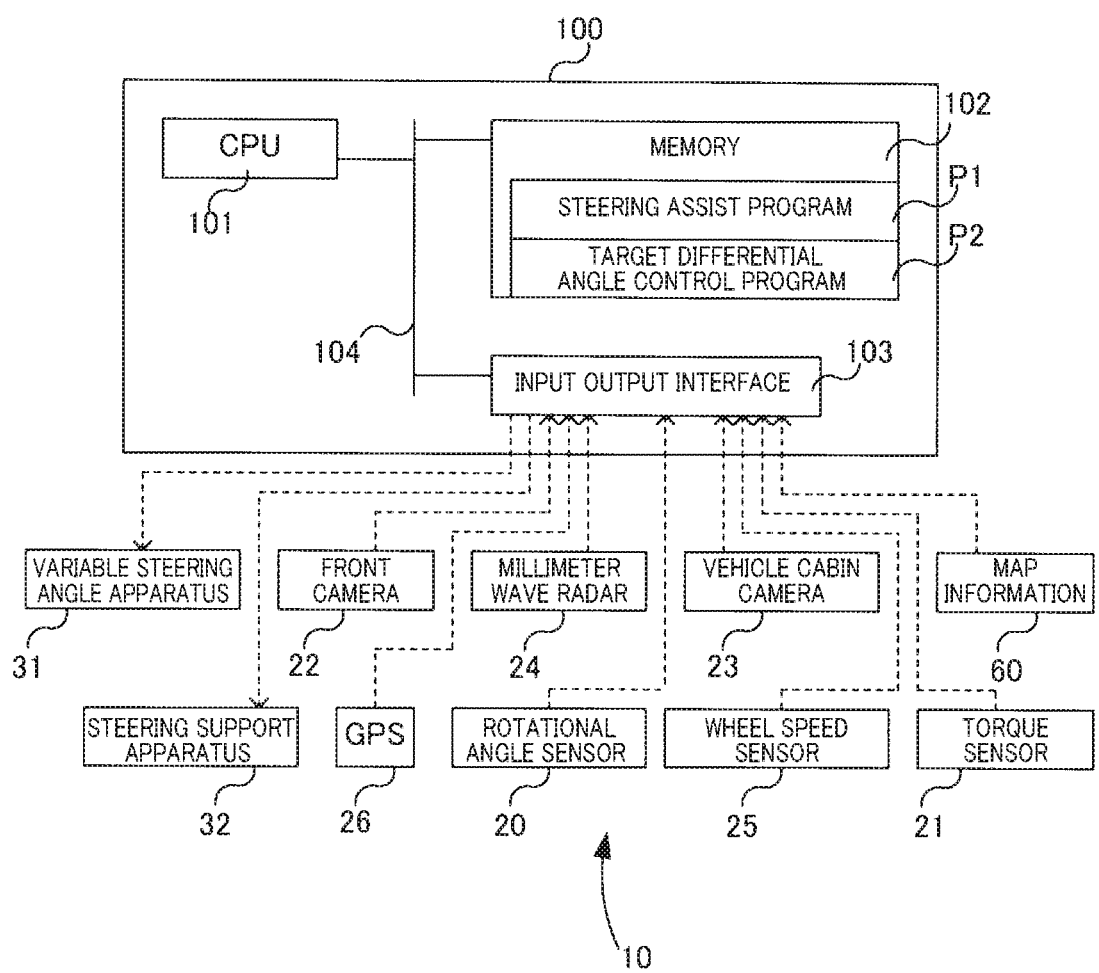
FIG. 3 is a block diagram showing functional elements of the control unit included in the steering assist apparatus according to the first embodiment.

As shown in FIG. 3, the control unit 100 includes a central processing unit (CPU) 101, a memory 102, an input/output interface 103 and a bus 104. The CPU 101, the memory 102 and the input/output interface 103 are electrically connected via a bus to be capable of performing a bi-directional communication therebetween. The memory 102 includes a memory region as a read-only non-volatile memory such as ROM, storing a steering assist program P1 and a target differential angle control program P2, and a memory region as a volatile memory such as RAM, where the CPU 101 can read or write. The memory 102 also includes a memory region that stores a map data used for a navigation system. The steering assist program P1 determines the turning angle θw, i.e., target turning angle θw* which is set by the steering apparatus 42 in accordance with at least either a running state of the vehicle or the road information, and executes an automatic steering mode that controls the steering support apparatus 32. The target differential angle control program P2 determines a target differential angle θg* of a differential angle θg which is a difference between the turning angle θw and the steering angle θs and controls the differential angle θg to be the determined target differential angle θg*. According to the present embodiment, during a transition period from the automatic steering mode to the manual steering mode or an elapsed period after completing the transition period, the target differential angle control program p2 determines, when a steering intervention which is input variation through the steering wheel 41 is not detected, the target differential angle to be closer to a target differential angle $\theta g_{auto}$ (automatic steering target differential angle) which is used for the automatic steering mode (i.e., approximation process), and determines, when the steering intervention is detected through the steering wheel 41, a memorized target differential angle which is memorized in the transition period between the automatic steering mode and the manual steering mode to be the target differential angle, thereby controlling the differential angle θg to be the target differential angle.

The CPU 101 executes the steering assist program P1 thereby serving as a steering control unit that executes the automatic steering mode, and executes the target differential angle control program P2 so as to determine the target differential angle to be close to the target differential angle $\theta g_{auto}$ of the automatic steering mode or determine the target differential angle to be the memorized target differential angle, thereby serving as a target differential angle control unit that controls the differential angle to be the determined target differential angle. Note that the steering control unit that executes the automatic steering mode may include, in addition to the CPU 101, a steering support apparatus 32 that controls the turning angle of the steering apparatus 42 in accordance with a control signal transmitted from the CPU 101. According to the present embodiment, the steering support apparatus 32 is a steering apparatus drive unit serving as an actuator that drives the steering apparatus 42 of the automatic steering mode to produce the target turning angle θw*. Also, in the present embodiment, the target differential angle control unit includes, in addition to the CPU 101, the variable steering angle apparatus 31 that performs variable control of the differential angle in accordance with the control signal from the CPU 101. The CPU 101 may be configured of a single CPU or a plurality of CPUs that execute respective programs, or a multi-thread CPU capable of simultaneously executing a plurality of programs.

Each of the rotational angle sensor 20, the torque sensor 21, the front camera 22, the vehicle cabin camera 23, the millimeter wave radar device 24, the wheel speed sensor 25, the GPS 26, a variable steering angle apparatus 31 and a steering support apparatus 32 is connected to the input/output interface 103 via a control signal line. The detection information is transmitted from the rotational angle sensor 20, the torque sensor 21, the front camera 22, the vehicle cabin camera 23, the millimeter wave radar device 24, the wheel speed sensor 25 and the GPS 26 via the input/output interface 103. The control signals that command a target differential angle and a target turning angle are transmitted to the variable steering angle apparatus 31 and the steering support apparatus 32 via the input/output interface 103.

The rotational angle sensor 20 detects a steering position of the steering wheel 41, that is, a rotation angle of the upper steering shaft 43a. For example, the rotational angle sensor 20 may output a positive value for right rotation and a negative value for left rotation with respect to an angle 0° of the steering wheel 41 when the vehicle runs straight. Alternatively, the rotational angle sensor may output the steering angle as a positive value using 360° absolute angle and the rotation speed. As the rotational angle sensor 20, a magnetic type rotational angle sensor can be used.

The torque sensor 21 detects a rotational torque of the lower steering shaft 43b caused by the steering input from the steering wheel 41. The torque sensor 21 converts a phase difference caused by torsion produced on the torsion bar that couples divided two portions (not shown) of the lower steering shaft 43b, thereby detecting a steering torque as a steering power. For the steering torque to be detected, a right turn is expressed by a positive value and a left turn is expressed by a negative value with respect to the steering angle of the steering wheel 41 when the vehicle runs straight. The torque sensor 21 may include an integrated rotational angle sensor that detects the turning angle. Also, the torque sensor 21 may be provided to the upper steering shaft 43a.

The front camera 22 is configured of an imaging apparatus provided with an imaging device such as CCD, serving as a sensor that outputs image data as a detection result of contour information of the object by receiving visible light. The image data outputted from the front camera 22 is configured of a plurality of frame images successive with time. Each frame image is expressed by pixel data. According to the present embodiment, the front camera is disposed in the center of the upper part of the windshield 510. The pixel data outputted by the front camera 22 is monochrome pixel data or color pixel data. The front camera 22 is configured of a monocular camera or a compound-eye stereo camera.

The vehicle cabin camera 23 has the same configuration as the front camera 22. The vehicle cabin camera 23 is used for detecting a state of the driver in the vehicle cabin such as an angle of head, a state of eyelids, and visual-line movement.

The millimeter wave radar device 24 is a sensor that emits millimeter waves, and receives reflected waves reflected by an object, thereby detecting position of the object and the distance to the object. According to the present embodiment, the millimeter wave radar device 24 is disposed in the center of the front bumper 520, but, a plurality of millimeter wave radar devices 24 may be disposed through the entire surfaces of the front bumper 520, or on both side surfaces of the front bumper 520. The detection signal outputted from the millimeter wave radar device 24 may be a signal consisting of a sequence of points that shows a representative position of the object recognized from processed received waves in a processing circuit included in the millimeter wave radar device 24, or the detection signal may be a signal representing unprocessed received waves. In the case where the unprocessed received signal is used as the detection signal, a signal processing is performed in the control unit 100 so as to detect the position of the object and distance to the object. Note that instead of using a millimeter radar device, LIDAR may be used.

A wheel speed sensor 25 is mounted to each of the front wheels 501 and serves as a sensor detecting a rotation speed of the respective front wheels 501. The detection signal outputted from the wheel speed sensor 25 is pulse waves in which the voltage thereof is proportional to the wheel speed or an interval thereof is determined in response to the wheel speed. By using the detection signal from the wheel speed sensor 25, information such as the vehicle speed and travel distance of the vehicle can be obtained.

The GPS (global positioning system) 26 is a system including a receiver that receives signals from the GPS satellites and a control unit that determines a position of the receiver using the received signal, which identifies the vehicle position (latitude, altitude). The control unit 100 can determine road information by using the vehicle position obtained by the GPS 26, and map information 60 in which the vehicle position obtained by the GPS 26 is mapped on the map data. Note that the road information also includes, for example, information obtained through communication with other vehicles, that is, traffic information obtained from traffic information infrastructure.

As shown in FIG. 2, the control unit 100 constitutes functional units corresponding to a transmission ratio calculation unit M1, a target differential angle calculation unit M2 and a target differential angle calculation unit M2 and a target turning angle calculation unit M3, by executing various programs in the CPU 101. The transmission ratio calculation unit M1 calculates the transmission ratio $\alpha$ which is a ratio of a change amount of the turning angle ($\Delta\theta w$) to a change amount of the steering angle ($\Delta\theta s$). That is, the transmission ratio $\alpha$ is determined as the transmission ratio $\alpha = \Delta\theta w / \Delta\theta s$. The transmission ratio calculation unit M1 determines the transmission ratio $\alpha$ depending on the steering mode of the vehicle, such that the transmission ratio a is set to be a steering intervention transmission ratio $\alpha_{dor}$ when the driver intervenes the steering, and the transmission ratio $\alpha$ is set in the automatic steering mode, to be an automatic steering transmission ratio $\alpha_{auto}$. Generally, the transmission ratio $\alpha_{auto}$ in the automatic steering mode is set to be larger than a steering transmission ratio $\alpha_{man}$ in the manual steering mode in order to suppress the movement of the steering wheel 41 in the automatic steering mode. The transmission ratio calculation unit M1 determines that the driver intervenes the steering operation (i.e., steering intervention state) when at least either the steering angle θs or the steering torque Ts is larger than or equal to a predetermined determination steering angle θt or a predetermined determination steering torque Tt respectively, during the automatic steering operation. The transmission ratio $\alpha_{dor}$ which is set during the steering intervention state may be the same as the transmission ratio $\alpha_{man}$ in the manual steering mode where the steering apparatus 42 operates in accordance with the steering angle θs inputted through the steering wheel 41. That is, after the steering intervention is detected, the steering mode is a state where the manual steering mode overrides the automatic steering mode or a state where the steering mode is switched to the manual steering mode. Hence, the transmission ratio $\alpha_{man}$ of the manual steering mode may be used in this state.

The target differential angle calculation unit M2 calculates, by using the transmission ratio $\alpha$, a target turning angle θg* which is a differential angle to be produced by the variable steering angle apparatus 31. The target differential angle calculation unit M2 is accomplished by the CPU 101 executing the target differential angle control program P2, in which the target differential angle θg* is calculated by using the transmission ratio $\alpha$ obtained by the transmission ratio calculation unit M1, in accordance with the following equations (1) or (2).

$$\theta g^* = c\,(\alpha-1)\,\theta s + (1-c)\,\theta_{mg}^* \quad (1)$$

$$\theta g^* = \theta_{mg}^* \quad (2)$$

The equation (1) is applied for the automatic steering mode, a transition period from the manual steering mode to the automatic steering mode, and a period after the transition period has lapsed. The equation (2) is used for the manual steering mode triggered by steering intervention. The coefficient c in the equation (1) relates to the elapsed period after completing the transition period, and is used for determining a period for executing an approximation process of the target differential angle. The coefficient c varies between 0 and 1 and is incremented with an equation c=(c+Δt) where Δt represents calculation period, and T represents approximation process period. The manual steering mode refers to a steering mode in which the steering apparatus 42 is being operated by steering operation of the steering wheel 41. The manual steering mode may include, for example, a temporal manual steering mode in which the automatic steering mode is overridden by the steering intervention to activate the manual steering mode and resumed when the override is released, and a permanent manual steering mode when the automatic steering mode will not be performed subsequently. The target differential angle calculation unit M2 stores a target differential angle in a transition period from the automatic steering mode to the manual steering mode, or a transition period from the manual steering mode to the automatic steering mode, that is, current target differential angle, into the memory 102 as the memorized target differential angle θmg*.

The target differential angle calculation unit M2 transmits the calculated target differential angle θg* to the variable steering angle apparatus 31. The variable steering angle apparatus 31 converts the target differential angle θg* received by the motor control unit to a motor torque command, thereby producing the target differential angle θg*. Alternatively, a target differential angle change amount Δθg* may be calculated instead of calculating the target differential angle Δθg*, and the calculated target differential angle change amount Δθg* may be transmitted to the motor control unit. In this case, angle θg as an origin is added to the target differential angle change amount Δθg*, whereby a command to be transmitted to the motor can be calculated. Also, a movement of the steering wheel 41 which is visually recognized by the driver is defined as a change amount. However, the motor torque command to the motor is defined as a command for producing the target differential angle Δθg*. The target differential angle calculation unit M2 is constituted by executing the target differential angle control program.

The target turning angle calculation unit M3 calculates the target turning angle θw* which is controlled by the steering support apparatus 32, by using an image signal from the front camera 22, a running state including a detection signal from the millimeter wave radar 24, and road information including a map information 60. The target turning angle θw* does not depend on the steering angle inputted by the driver via the steering wheel 41, but is determined as the turning angle θw of the steering apparatus 42, based on the running speed of the own vehicle, running state affected by front/side vehicles and obstacles on the running route, road information including shape of the road such as straight, curve, increasing/decreasing the number of traffic lanes and sloping road. The target turning angle θw* is transmitted to the motor control unit of the steering support apparatus 32 from the target turning angle calculation unit M3. The steering support apparatus 32 converts the target turning angle θw* received by the motor control unit to be the motor torque command, thereby controlling the motor to achieve the target turning angle θw*.

The automatic steering mode is accomplished by executing the steering assist program P1 with the CPU 101. The CPU 101 determines a running locus along which the own vehicle runs, based on the state of the own vehicle and running state including other vehicles, and the road information including the map information 60. Also, the CPU 101 successively determines the target turning angle θw* which is the turning angle with which the front wheels 501 are required to turn based on the running speed of the own vehicle obtained by the wheel speed sensor 25 and the map information 60 in which the own vehicle position is mapped by using the GPS 26. The running locus determined by the CPU 101 and the target turning angle θw* successively determined by the CPU 101 are transmitted to the steering support apparatus 32. The motor control unit of the steering support apparatus 32 applies a torque command depending on the received target turning angle θw*, for example, voltage to the motor, thereby producing the target turning angle θw*. Note that the automatic steering mode may use, other than the running state and the road information, route information which is programmed in advance, guidance information installed along the road, for example, information from a guidance information facility that provides a beacon or the like.

When the automatic steering mode is operating, the steering angle of the steering wheel 41 changes in response to the operation of the steering apparatus 42. Specifically, the steering wheel 41 operates in response to the differential angle θg determined by the transmission ratio $\alpha_{auto}$ and the target turning angle θw*. In other words, the steering wheel 41 operates based on the steering angle θs which is determined in accordance with the turning angle θw of the steering apparatus 42 in the automatic steering operation. The steering angle θs=turning angle θw−differential angle θg. Since the actual movement of the steering wheel 41 recognized by the driver is defined as a change amount of the steering angle Δθs, the following equations are provided.

change amount of the steering angle Δθs=turning angle θw−differential angle θg change amount of the differential angle Δθg=(1−1/$\alpha_{auto}$) Δθw The automatic steering mode may be executed, for example, under a driving support mode performing only steering support in accordance with at least either the running state or the road information, or an automatic driving support mode including a driving support that accelerates the own vehicle and a braking support in addition to the steering support. The automatic steering mode may be performed not only for a case where the vehicle runs on an ordinary road or an expressway, but also for a case where the vehicle is parking in a parking lot or starting from the parking lot. The automatic steering mode continues to execute until an operation switch that turns the automatic steering mode ON or OFF is turned OFF, or a main switch that turns the automatic driving mode ON or OFF is turned OFF. Hence, after the driver intervenes in the steering operation, and when the predetermined period elapses without the intervention by the driver, the prioritized process of the manual steering mode is terminated, and the steering mode by the automatic steering mode is executed again or, an automatic steering mode which has been suspended is resumed.

Figure 4:
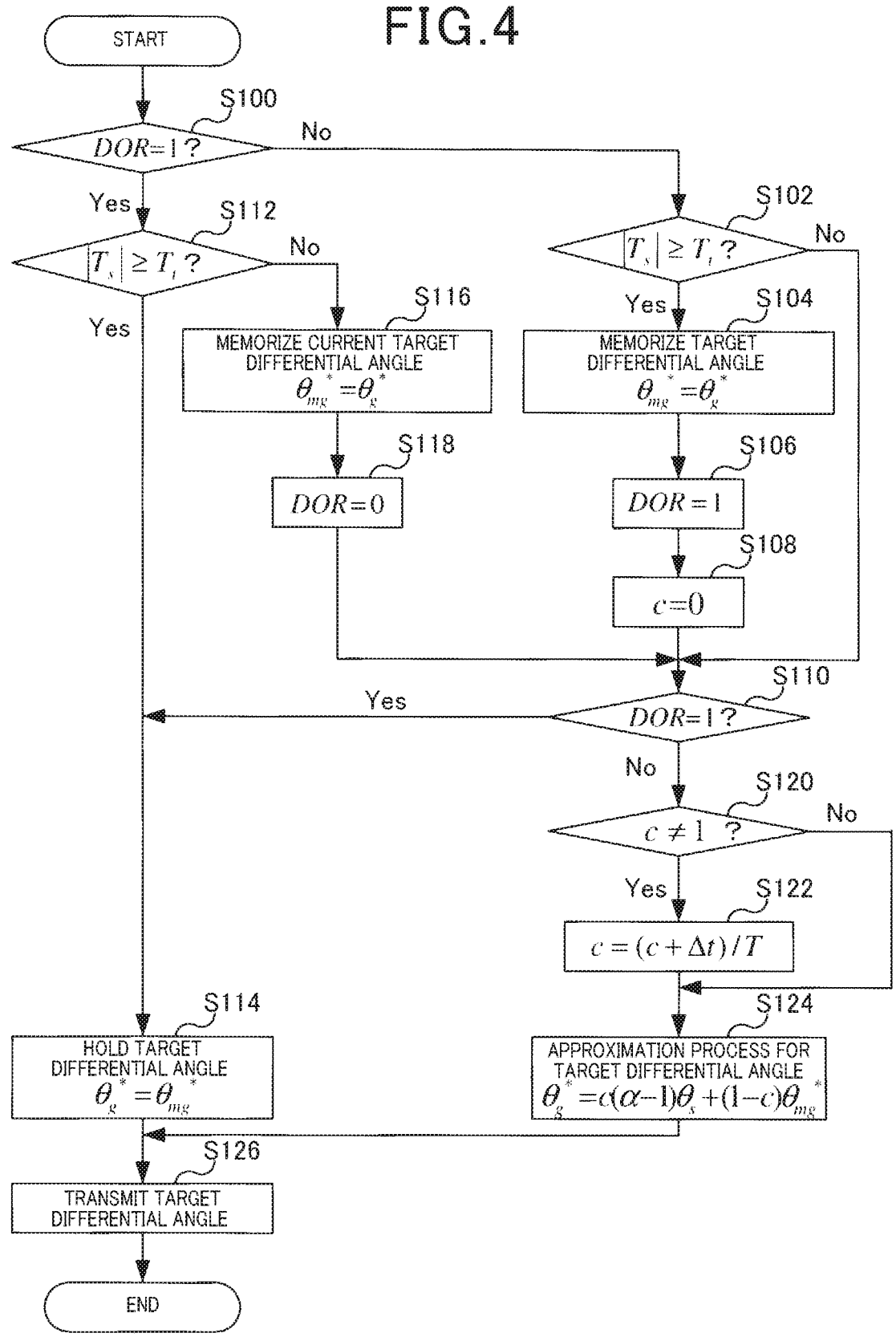
FIG. 4 is a flowchart showing a process flow of a target differential angle control executed by the steering assist apparatus according to the first embodiment.

With reference to FIG. 4, a target differential angle control process executed by a steering assist apparatus 10 according to the first embodiment will be described. The CPU 101 executes the target differential angle control P2, thereby executing a process routine shown in FIG. 4. Note that the process routine shown in FIG. 4 is repeatedly executed at a predetermined timing from when the automatic steering mode is activated to when the automatic steering mode is disabled, while the steering assist program P1 is being executed by the CPU 101.

The CPU 101 determines whether a steering intervention flag DOR indicating a detection of the steering intervention is set (ON) or not, that is, DOR=1 or not (step S100). When the process routine is initiated for the first time, the determination at step S110 has not been executed, and since the initial value DOR=0 is used, the CPU 101 determines that DOR=0 (step S100: No). The CPU 101 determines whether the absolute value of the steering torque Ts inputted by the torque sensor 21 is a determination steering torque Tt which is a predetermined threshold or more (step S102). The CPU 101 determines, by using a magnitude of the steering torque, whether the driver has intervened in the steering or not, that is, whether or an input variation of the steering wheel 41 is present. The determination steering torque Tt is a torque value to which a change in the turning angle of the front wheels 501 through the steering wheel 41 is reflected. This torque value is determined in advance and stored into the memory 102. When the automatic steering mode is performed, for example, the process detects a steering torque larger than or equal to the determination torque value Tt caused by the steering intervention of the driver. The steering intervention or the steering operation of the driver includes an increase of the steering angle, that is, a forward direction intervention in which the current turning angle is increased, and restoring the steering angle, that is, an inverse direction intervention producing a decrease of the current steering angle. The invert intervene includes a steering operation that produces a turning angle having an inverted sign with respect to the current turning angle. Note that presence or absence of the input variation may be determined by determining whether a change in the steering angle θs is larger than or equal to a predetermined reference value.

The CPU 101 determines, when the absolute value of the steering torque Ts is larger than or equal to the determination torque Tt, that is, |Ts|≥Tt (step S102:Yes), the target differential angle θg* to be the memorized target differential angle θmg*, and stores it into the memory 102 (step S104). This routine corresponds to a case where the steering intervention is detected in the automatic steering mode, and is executed when the steering intervention is activated. Note that the target differential angle θg* currently set is calculated based on the above-described equation (1) or (2). In equation (1), when the process routine is activated, c is set as c=1 and the transmission ratio α is set to be the transmission ratio $α_{auto}$ of the automatic steering mode. Hence, the equation (1) is expressed as θg*=(α−1) θs which is determined by the steering angle θs and the transmission ratio α. More specifically, during the automatic steering mode, since the steering support apparatus 32, which has accepted the target turning angle θw* calculated by the target turning angle calculation unit M3 based on at least either a running state of the vehicle or the road information, drives the steering apparatus 42, the steering angle θs is an angle produced by the operation of the steering support apparatus 32. Meanwhile, after activating the process routine, the target differential angle θg* calculated at step S124 together with an approximation process (described later) is stored into the memory 102 as the memorized target differential angle θmg*.

The CPU 101 sets the steering intervention flag DOR to ON, that is, DOR=1 (step S106), and sets the coefficient c to be 0 (c=0) in order to initialize the elapsed time (step S108), then process proceeds to step S110.

At step S102, the process proceeds to step S110 when the absolute value of the steering torque Ts is less than the determination torque Tt, that is, the condition |Ts|≥Tt is not met (step S102: No). This case corresponds to a case where the steering intervention is not detected during the automatic steering mode.

The CPU 101 determines whether the steering intervention flag DOR is 1, that is, DOR=1 or not (step S110), and proceeds to step S114, when the steering intervention flag DOR is determined as DOR=1. This process routine corresponds to a case where the steering intervention is detected during the automatic steering mode.

The CPU 101 holds and fixes the target differential angle θg* which is currently used, without newly calculating the target differential angle θg* based on the current running state of the vehicle 500. That is, the CPU 101 sets the target differential angle θg* to be the memorized target differential angle θmg* (step S114), and transmits the memorized target differential angle θmg* to the variable steering angle apparatus 31 (step S126), and the present process routine is terminated. As a result, while the steering intervention is present during the automatic steering mode, that is, during the manual steering mode, the differential angle θg is not changed so that discomfort of the driver caused by a change in the differential angle θg can be reduced or cancelled.

Once the present process routine is executed and if the steering intervention is present, the steering intervention flag DOR is set to 1, that is, DOR=1. In this case, the CPU 101 determines that the steering intervention flag DOR is 1, that is, DOR=1 at step 100 (step S100: Yes), and determines whether the steering intervention is still present (step S112). When the condition |Ts|≥Tt is satisfied (step S112: Yes), the process proceeds to step S114 and holds the target differential angle θg*, that is, the process determines that the target differential angle θg* to be the memorized target differential angle θmg*, transmits the memorized target differential angle θmg* to the variable steering angle apparatus 31 (step S126), and terminates the present process routine. The determined target differential angle θg* is inputted to the variable steering angle apparatus 31 to produce the differential angle θg based on the determined target differential angle θg*. This process routine is for a case where the steering intervention continues during the automatic steering mode. Accordingly, during the manual steering mode triggered by a steering intervention, discomfort of the driver caused by a change in the differential angle θg can be reduced or cancelled.

The CPU 101 stores the current target differential angle θg* as the memorized target differential angle θmg* into the memory 102 (step S116), when the process determines that the steering intervention is not present at step S112, that is, a condition |Ts|<Tt is satisfied (step S112: No). The target differential angle θg* calculated at step S104 when the present process routine is activated or the target differential angle θg* to be calculated at step S124 (described later) is stored into the memory 102 as the memorized target differential angle θmg*. The CPU 101 sets the steering intervention flag DOR to be zero, that is, DOR=0 (step S118), and the process proceeds to step S110. This process routine corresponds to a case where the steering intervention is terminated during the automatic steering mode.

The CPU 101 determines whether DOR flag is 1, that is, DOR=1, or not at step S110 and proceeds to step S120 when the DOR is not determined as DOR=1, that is, the steering intervention is not present (step S110: No). When the process executes steps S116 and S118, it is determined that DOR is not 1, and when the process executes steps S104, S106 and S108, it is determined that the DOR is 1, that is, DOR=1.

The CPU 101 determines, at step S120, whether the coefficient c≠1 or not, that is, determines whether the elapsed period after completing the transition period is elapsed, where the transition period is determined as a period from the manual steering mode is changed to the automatic steering mode. When the CPU 101 determines that the coefficient is not 1, that is, c≠1 (step S120: Yes), the process increments the coefficient c (step S122). In other words, this is expressed by an equation: c=(c+Δt)/T. When the CPU 101 determines that the coefficient c=1 (step S120: No), the process proceeds to step S124. In this case, the approximation process period T is completed so that the coefficient c is kept as 1.

The CPU 101 executes an approximation process of the target differential angle θg* by using the above-described equation (1) (step S124), transmits a target differential angle θg* calculated through the approximation process or a target differential angle θg* calculated without the approximation process due to completion of the elapsed period to the variable steering angle apparatus 31 (step S126), and terminates the procedure. Specifically, at step S120, when the coefficient c is determined as c=1, the process calculates, by using an equation θg*=c ($α_{auto}$−1) θs, the target differential angle θg* without the approximation process. At step S120, when the process determines that the coefficient is not 1, that is, c≠1, the process calculates the target differential angle θg* with a following equation.

$$θg^* = c (α_{auto}-1) θs + (1-c) θmg^* \quad (1)$$

Hence, during the automatic steering mode, the target differential angle θg* gradually approaches the target differential angle θg* to be used in the automatic steering mode. The variable steering angle apparatus 31 produces the differential angle θg in accordance with the calculated target differential angle θg*.

According to steering assist apparatus 10 of the above-described first embodiment, an approximation process is executed when the steering intervention is not present, so as to approach the target differential angle θg* to be used in the automatic steering mode. When the steering intervention is present, the current target differential angle θg* is maintained regardless of the steering angle θs. Specifically, during a transition period from the manual steering mode to the automatic steering mode and an elapsed period after the transition period, the process executes the approximation process of the target differential angle and a control of the differential angle to be the target differential angle to which the approximation process is performed. Therefore, the variable steering angle apparatus 31 does not change the differential angle θg while the driver is operating the steering wheel 41, so that the relationship is maintained between the steering angle θs determined in response to the steering operation of the steering wheel 41 and the turning angle θw in accordance with the steering angle θs. As a result, a change in the turning angle θw which is not due to a steering operation, caused by a change in the differential angle θg, does not occur, so that discomfort of the driver caused by a change in the turning angle θw which occurs independently from the steering angle θs can be removed. Also, when no steering intervention is present, since the approximation process to the target differential angle θg* is executed, unnecessary movement of the steering wheel 41 during the automatic steering mode can be suppressed.

Second Embodiment

A steering assist apparatus according to a second embodiment differs from the steering assist apparatus 10 of the first embodiment in that a steering intervention is determined by using the steering angle in addition to the steering torque. Since the steering assist apparatus according to the second embodiment includes similar configurations to the steering assist apparatus 10 of the first embodiment, the same reference numbers are applied to the same configuration, and the explanation thereof will be omitted.

Figure 5:
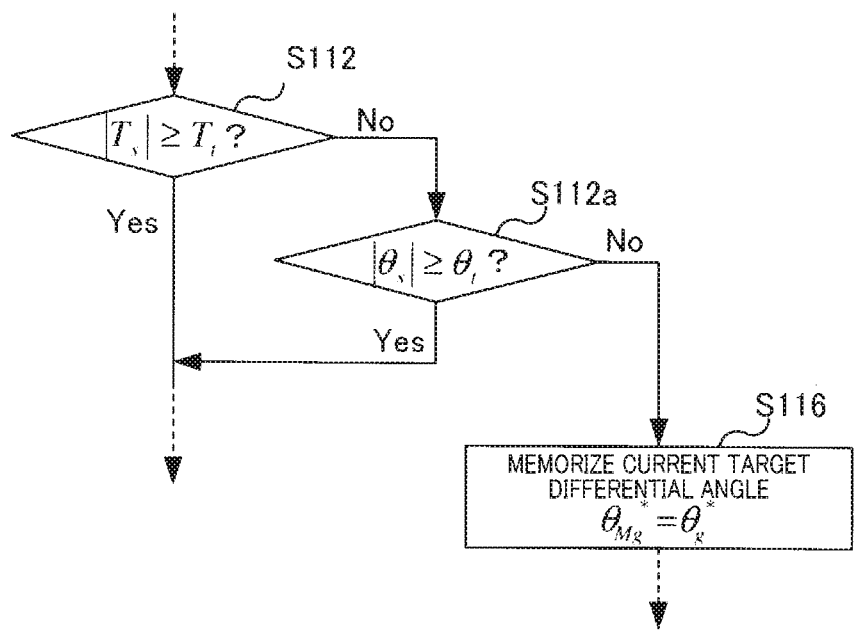
FIG. 5 is a flowchart showing a characteristic part of the process flow of the target differential angle control executed by steering assist apparatus according to a second embodiment.

With reference to FIG. 5, a steering intervention determination process in a steering assist apparatus 10 according to the second embodiment will be described. In FIG. 5, only steps corresponding to step S112 which relates to the steering intervention determination shown in FIG. 4 are illustrated and explanation for the rest of the steps is omitted. Also, a process at step S102 shown in FIG. 4 can be determined similarly. The CPU 101 determines whether the steering intervention is present or not based on the steering torque at first (step S112). When the CPU 101 determines that a condition |Ts|≥Tt is satisfied (step S112: Yes), the process proceeds to step S114. When the CPU 101 determines that the condition |Ts|≥Tt is NOT satisfied (step S112: No), the CPU 101 determines whether the absolute value of the steering angle θs transmitted from the rotational angle sensor 20 is larger than or equal to a steering intervention determination angle θt, that is |θs|≥θt or not (step S112a). When the CPU 101 determines that the condition |θs|≥θt is satisfied (step S112a: Yes), the CPU 101 determines that the steering intervention is present and proceeds to step S114. The CPU 101 determines that the steering intervention is not present when the condition |θs|≥θt is not satisfied (step S112a: No), and proceeds to step S116.

According to the steering assist apparatus 10 of the above-described second embodiment, presence of the steering intervention can be determined by using the steering angle θs in addition to the steering torque Ts. Therefore, a state where the steering torque Ts is small but the steering angle θs is large can be appropriately detected as the steering intervention state. Further, since the approximation process of the target differential angle θg* is executed when the steering angle θs is small, a change in the steering angle θs due to the approximation process of the target differential angle θg* becomes small so that visual sense of incongruity by the driver can be reduced or removed. Note that the steering intervention may be determined only with the steering angle θs without using the steering torque Ts. In this case, the determination of the steering torque Ts can be omitted, while keeping the advantages concerning the steering angle θs.

Third Embodiment

A steering assist apparatus according to the third embodiment differs from the steering assist apparatus 10 according to the first embodiment in that the steering intervention is determined based on a determination whether the same sign (i.e., either positive or negative) or different signs (i.e., positive and negative) are used between the steering torque and the steering angular velocity. Since the steering assist apparatus according to the third embodiment has the same configurations as the steering assist apparatus 10 of the first embodiment, the same reference number is applied to the same configuration, and the explanation thereof will be omitted.

Figure 6:
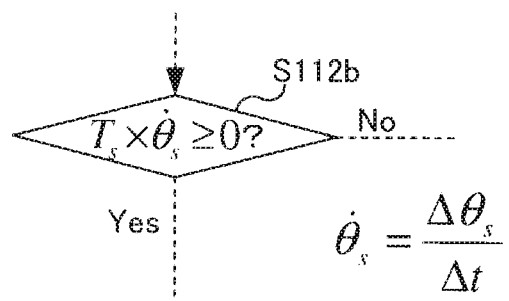
FIG. 6 is a flowchart showing a characteristic part of the process flow of the target differential angle control executed by steering assist apparatus according to a third embodiment.

With reference to FIG. 6, a steering intervention determination process of the steering assist apparatus 10 according to the third embodiment will be described. In FIG. 6, only steps corresponding to step S112 which relates to the steering intervention determination shown in FIG. 4 are illustrated and explanation for the remaining steps is omitted. Also, a process at step S102 shown in FIG. 4 can be determined similarly. The CPU 101 determines whether the steering intervention is present or not based on a determination whether the same sign (i.e., either positive or negative) or different signs (i.e., positive and negative) are used for the values used to calculate the product between the steering torque and the steering angular velocity, that is, whether the product between the steering torque Ts and the differential value of the steering angle θs is larger than zero (i.e., Ts·Δθs/Δt≥0) or not (step S120b). The CPU 101 determines that the steering intervention is present when the product between the steering torque Ts and the differential value of the steering angle θs is larger than zero (step S120b: Yes), and proceeds to step S114. Note that a case where the steering torque Ts and the steering angular velocity expressed as Δθs/Δt have the same sign refers to a state where the driver operates the steering wheel 41 in the desired steering direction so as to advance the vehicle 500 towards desired travelling direction. In other words, a direction along which the steering wheel 41 rotates and a direction along which the torque is applied to the steering wheel 41 are the same in left or right rotation with respect to the neutral position of the steering wheel 41.

The CPU 101 determines that the steering intervention is not present when the product between the steering torque Ts and the differential value of the steering angle θs is NOT larger than or equal to 0, that is, different signs and negative value (step S120b: No), and proceeds to step S116. A state where the steering torque Ts and the steering angular velocity Δθs/Δt have different signs refers to a state where the steering wheel 41 returns to the neutral position by a self-aligning torque, or a state where the driver changes the position of the steering wheel 41 to be the neutral position. In this state, it is determined that the driver merely supports the steering wheel 41 passively and the steering intervention is not present.

According to the steering assist apparatus 10 of the third embodiment, in the case where the driver passively holds the steering wheel 41, the target differential angle θg* is approximated to the target differential angle θg* of the automatic steering mode, and the target differential angle θg* is fixed to the current target differential angle. Therefore, the differential angle θg is not changed when the driver actively operates the steering wheel 41 so that discomfort of the driver can be reduced or removed. Also, since the process can determine completion of the steering intervention based on a timing at which the driver starts to return the steering wheel 41 to be the neutral position, proper target differential angle, that is, the target differential angle θg* in the automatic steering mode can be resumed faster. Moreover, instead of using the steering torque Ts, the steering intervention can be determined by using the steering angle θs.

Fourth Embodiment

The steering assist apparatus according to the fourth embodiment differs from the steering assist apparatus 10 of the first embodiment in that the steering intervention is determined based on a determination whether the vehicle 500 changes the running state from a turning state to a straight forward state, instead of using the steering torque. Note that since the steering assist apparatus according to the fourth embodiment includes similar configuration to the steering assist apparatus 10 of the first embodiment, the same reference numbers are applied to the same configurations and the explanation thereof will be omitted.

Figure 7:
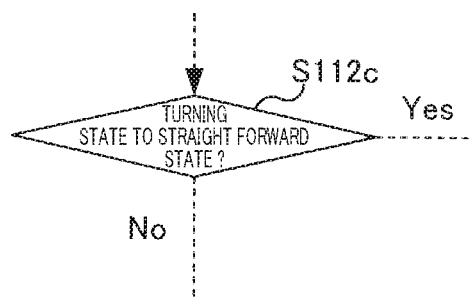
FIG. 7 is a flowchart showing a characteristic part of the process flow of the target differential angle control executed by steering assist apparatus according to a fourth embodiment.

With reference to FIG. 7, a steering intervention determination process of the steering assist apparatus 10 according to the fourth embodiment will be described. In FIG. 7, only steps corresponding to step S112 which relates to the steering intervention determination shown in FIG. 4 are illustrated and explanation for rest of steps are omitted. Also, a process at step S102 shown in FIG. 4 can be determined similarly. The CPU 101 determines whether steering intervention is present or not based on a determination whether the running state of the vehicle 500 changes from a turning state to a straight forward state (step S112c). The CPU 101 determines that the steering intervention will not occur when the running state of the vehicle 500 changes the turning state to the straight forward state (step S112c: Yes) and proceeds to step S116. For example, when the vehicle 500 enters a straight road from a curved road, since the steering wheel 14 returns to the neutral position by a self-aligning torque, the driver passively supports the steering wheel 41, or the driver returns the steering wheel 41 to the neutral position. Accordingly, the process determines that the driver will not actively intervene in the steering (i.e., this is not active intervention). A transition of the running state from the curved road to the straight-forward road is determined such that a change in the road curvature is detected based on a map information 60 or a detection of white lines or the like by the front camera 22, and also a transition of the running state from the turning state to the straight-forward state is determined when the road curvature is decreased. Further, by using a yaw rate sensor, a vertical acceleration factor and a horizontal acceleration factor can be used to determine the transition state from the tuning state to the straight-forwards state.

The CPU 101 proceeds to step S114 when the running state of the vehicle 500 is NOT changed from the turning state to the straight forward state (step S112c: No).

According to the steering assist apparatus 10 of the fourth embodiment, since the steering intervening of the driver is determined based on a determination whether the running state of the vehicle 500 changes from the turning state to the straight-forward state, the determination of the steering intervention can be completed earlier. That is, since presence of the steering intervention is determined by using the running state of the vehicle 500 or the road information, proper target differential angle, that is, the target differential angle θg* in the automatic steering mode can be resumed faster. Note that an estimation error of the steering intervention can be compensated by combination with the third embodiment in which an actual steering operation of the driver for the steering wheel 41 is detected.

Modifications (1) First Modification

According to the first to fourth embodiments, examples have been described for a case where the process routine shown in FIG. 4 is executed. The process routine shown in FIG. 4 may be repeatedly executed at predetermined periods, regardless of the execution of the automatic steering mode, after the main switch (i.e., ignition switch) of the vehicle 500 is turned ON. In this case, the process routine shown in FIG. 4 is executed also in a state where the automatic steering mode is not executed excluding a state of temporary manual steering mode triggered by the steering intervention in the automatic steering mode, that is, a state in which the vehicle remains in a manual steering mode without changing the state to the automatic steering mode.

Even when the manual steering mode is executed, the process determines DOR to be 0 (i.e., DOR=0) when the process routine is first executed (step S100: No). During the manual steering mode, since input variation via the steering wheel 41 is present which is caused by the driver, that is steering operation is conducted by the driver, the absolute value of the steering torque Ts is larger than or equal to the determination steering torque Tt (step S102: Yes), the steering intervention flag DOR is set to 1 (i.e., DOR=1) (step S106). In step S110, the process determines DOR to be 1 (i.e., DOR=1) (step S110: Yes) and executes step S114. Hence, in the case where the manual steering mode is executed, the target differential angle θg* is fixed to the target differential angle θg* calculated by using the transmission ratio $\alpha_{man}$ in the manual steering mode, a condition c=1 and the above-described equation (1). Hence, while the driver operates the steering wheel 41, the differential angle θg which is a relative angle between the turning angle θw and the steering angle θs does not vary.

In the case where the process routine shown in FIG. 4 is executed once and steering intervention is present in the manual steering mode, the steering intervention flag DOR is set to 1 (i.e., DOR=1). In this case, the process reads the DOR as DOR=1 (step S100: Yes), and determines whether the steering operation still continues or not based on the steering torque (step S112). As the determination steering torque Tt, a first threshold and a second threshold which is larger than the first threshold are used. The first threshold is used for determining a continuation of the manual steering mode, and the second threshold is used for determining a continuation of the steering intervention in the automatic steering mode. The steering torque Ts caused by a steering operation by the vehicle-driving in the manual steering mode may be smaller than a steering torque Ts caused by a steering intervention in the automatic steering mode, such as a case where the driver passively operates the steering wheel 41 or makes a fine adjustment of the steering angle. Accordingly, two thresholds are used to distinguish the steering interventions between the manual steering mode and the automatic steering mode.

When it is determined that the absolute value of the steering torque Ts is the second threshold or more, the CPU 101 determines that the steering intervention in the automatic steering mode still continues and proceeds to step S114. When it is determined that the absolute value of the steering torque Ts is less than the second threshold, the CPU 101 further determines whether the absolute value of the steering torque Ts is larger than or equal to the first threshold or not. In other words, the CPU determines whether the steering operation is continuing in the manual steering mode. When it is determined that the absolute value of the steering torque Ts is larger than or equal to the first threshold, the CPU 101 determines that the steering operation of the manual steering mode continues and proceeds to step S114. At step S114, the current target differential angle $\theta g^*$ is fixed to the calculated target differential angle $\theta g^*$ calculated by using the transmission ratio $\alpha_{man}$ in the manual steering mode, a condition c=1 and the above-described equation (1), whereby the driver does not feel discomfort. When it is determined that the absolute value of the steering torque Ts is less than the first threshold, the CPU 101 determines that the steering operation of the manual steering mode is not continuing and the steering intervention of the automatic steering mode does not continue and proceeds to step S116. According to the first modification, regardless of the manual steering mode or the automatic steering mode, the process routines shown in FIG. 4 can be executed.

(2) Second Modification

Figure 8:
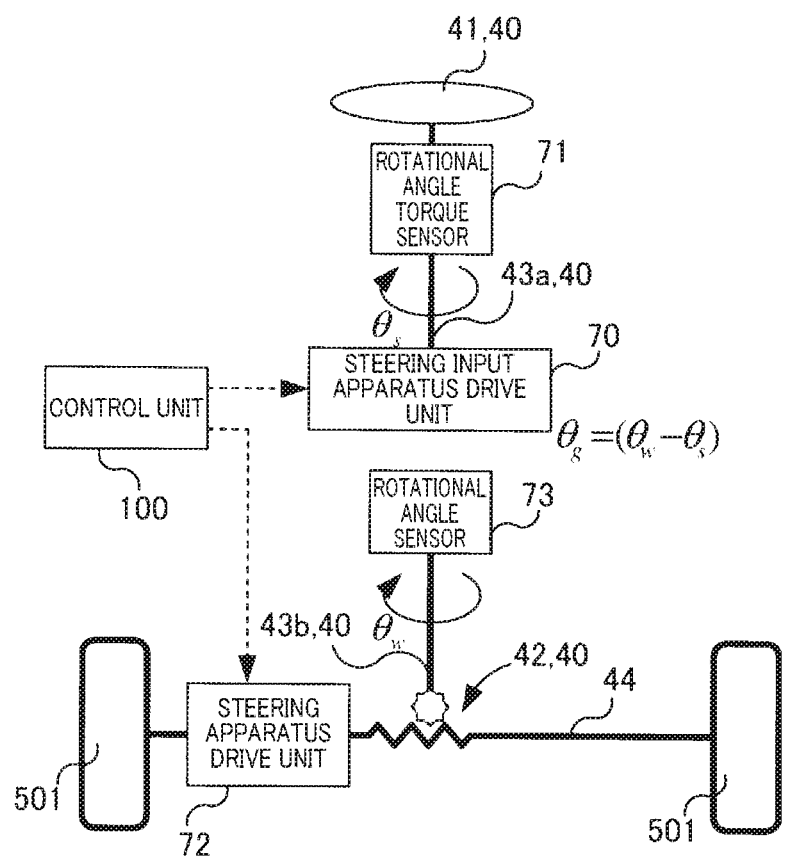
FIG. 8 is an explanatory diagram exemplifying a steering mechanism of a steering assist apparatus according to a second modification.

According to the above-described embodiments, as the steering mechanism 40, a combination of the variable steering angle apparatus 31 and the steering support apparatus 32 is used. However, as shown in FIG. 8, a steer-by-wire mechanism having no mechanical connections between the steering wheel 41 and the turning apparatus 42 may be used. In this case, a steering input apparatus drive unit 70 including a steering side motor that produces a reaction force is mounted to a tip end of the upper steering shaft 43*a* which is connected to the steering wheel 41, and a rotational torque sensor 71 that detects the rotational angle and the torque is mounted to the upper steering shaft 43*a*. In the steering apparatus 42, a steering apparatus drive unit 72 including a turning side motor is disposed. A rotational angle sensor 73 is disposed at the lower steering shaft 43*a*. In the automatic steering mode, the control unit 100 controls the turning side motor of the steering apparatus drive unit 72 so as to produce the turning angle $\theta w$ determined as described above, thereby driving the steering apparatus 42. The control unit 100 drives, by using the turning angle $\theta w$ detected by the rotational angle sensor 73, the steering side motor of the steering input apparatus drive unit 70 so as to cause the steering wheel 41 to take the steering angle $\theta s$ to produce the differential angle $\theta g$. In the manual steering mode, the control unit 100 determines the turning angle in accordance with the steering angle of the steering wheel 41 detected by the rotational angle torque sensor 71 and the determined differential angle, controls the turning side motor of the turning apparatus drive unit 72, thereby driving the steering apparatus 42. When the steer-by-wire mechanism is used, the steering input apparatus drive unit 70 and the steering apparatus drive unit 72 serve as the variable steering angle apparatus 31. The control unit 100, the steering input apparatus drive unit 70 and the steering apparatus drive unit 72 constitute the target differential angle control unit. Further, instead of using the steering wheel 41 which is rotatably operated, a stick type steering input apparatus which is linearly operated, that is, steering stick may be used. For example, the steering stick moves reciprocally on a straight line having the center point which is a neutral point, where operational positions on the straight line correspond to the steering angle $\theta s$. The steering position as the operational position on the straight line is converted to the steering angle $\theta s$ and used for the existing processes. Therefore, the steering angle of the steering input apparatus is a concept including the steering position. Even in this case, a change amount in the steering position may have similar problems to the change amount of the steering angle. Even when the steer-by-wire mechanism is used, the above-described advantages in the embodiments can be obtained.

(3) Third Modification

The third modification can be achieved by combining the first to fourth embodiments or, by combining determination processes of respective embodiments. For example, the process may determine, by using a determination whether the steering wheel 41 is returning to the neutral position and a determination based on the steering torque, that the steering intervention is not present when the steering wheel 41 is restoring and the steering torque Ts is smaller than or equal to the determination threshold.

(4) Fourth Modification

In addition to determinations of steering intervention according to the first to fourth embodiments, the process may determine that a steering intervention is present when the absolute value of the steering torque Ts is larger than or equal to the determination torque Tt for a certain period of time, and may determine that the steering intervention is completed when the absolute value of the steering torque Ts is less than the determination torque Tt for a certain period of time.

(5) Fifth Embodiment

In the first to fourth embodiments, the CPU 101 executes the steering assist program P1 and the target differential angle control program P2, thereby implementing the steering control unit and the target differential angle control unit as software. However, the steering control unit and the transmission ratio determination unit may be implemented as hardware configured of, for example, an integrated circuit programmed in advance, or discrete circuits.

The present disclosure has been described based on the embodiments and modifications. The above-described embodiments are provided to readily understand the present disclosure and do not limit the present disclosure thereof. The present disclosure may be modified and improved without departing the sprit and the scope of claims, and includes equivalents thereof. For example, embodiments corresponding to technical features in the various aspect described in the summary section, and technical features described in the modifications sections can be appropriately replaced or combined to solve a part of or all of the above-described problems or to achieve a part of or all of the above-described effects. Moreover, when any of those technical features are not described in the present specification as essential features, the feature can be appropriately removed.

Application example 1: A steering assist apparatus of the vehicle according to the above-described first aspect is defined as an application example 1, for example.

Application example 2: In the steering assist apparatus according to the application example 1, the target differential angle control unit determines a memorized target differential angle which is memorized in the transition period between the automatic steering mode and the manual steering mode to be the target differential angle when the input variation is detected through the steering input apparatus.

Application example 3: In the steering assist apparatus according to application example 1, the target differential angle control unit detects input variation through the steering input apparatus by using a steering torque of the steering input apparatus.

Application example 4: In the steering assist apparatus according to application example 3, the target differential angle control unit disables a detection of the input variation when the steering torque is less than or equal to a predetermined threshold.

Application example 5: In the steering assist apparatus according to application example 3, the target differential angle control unit detects the input variation through the steering input apparatus by using the steering angle of the steering input apparatus.

Application example 6: In the steering assist apparatus according to application example 5, the target differential angle control unit disables detection of the input variation when the steering angle is within a predetermined steering angle range.

Application example 7: In the steering assist apparatus according to application example 3, the target differential angle control unit disables a detection of the input variation when a sign indicating a change direction of the turning angle of the steering apparatus and a sign indicating a change direction of the steering angle of the steering input apparatus are different from each other.

Application example 8: In the steering assist apparatus according to application example 1, the target differential angle control unit disables a detection of the input variation when the vehicle is determined, based on road information, to be in a transition period between a turning state and a straight forward state.

Application example 9: In the steering assist apparatus according to application example 1, the steering assist apparatus further including a variable steering angle apparatus that generates a differential angle between the steering angle and the turning angle; and the target differential angle control unit transmits the determined target differential angle to the variable steering angle apparatus, thereby controlling the target differential angle.

Application example 10: In the steering assist apparatus according to application example 1, wherein the steering assist apparatus further including a steering input apparatus drive unit that drives the steering input apparatus; the steering input apparatus and the steering apparatus are not mechanically connected; and the target differential angle control unit controls the steering drive unit and the steering input apparatus drive unit, thereby controlling the target differential angle.

What is claimed is:

1. A steering assist apparatus of a vehicle provided with a steering input apparatus and a steering apparatus, the steering input apparatus and the steering apparatus performing a differential operation with a differential angle in which a steering angle and a turning angle are determined, the steering assist apparatus comprising:
    a steering drive unit that drives the steering apparatus;
    a steering control unit that executes an automatic steering mode in which the steering drive unit is controlled such that a turning angle is determined based on at least either a running state of the vehicle or road information to produce the determined turning angle; and
    a target differential angle control unit that determines a target differential angle and controls the differential angle to be the is determined target differential angle, wherein
    the target differential angle control unit determines the target differential angle to be close to an automatic steering target differential angle used for the automatic steering mode, when input variation through the steering input apparatus is not detected during a transition period from a manual steering mode in which the steering apparatus operates in response to the steering angle inputted through the steering input apparatus to the automatic steering mode or during an elapsed period after completing the transition period.

2. The steering assist apparatus according to claim 1, wherein
    the target differential angle control unit determines a memorized target differential angle which is memorized in the transition period between the automatic steering mode and the manual steering mode to be the target differential angle when the input variation is detected through the steering input apparatus.

3. The steering assist apparatus according to claim 1, wherein
    the target differential angle control unit detects input variation through the steering input apparatus by using a steering torque of the steering input apparatus.

4. The steering assist apparatus according to claim 3, wherein
    the target differential angle control unit disables a detection of the input variation when the steering torque is less than or equal to a predetermined threshold.

5. The steering assist apparatus according to claim 3, wherein
    the target differential angle control unit detects the input variation through the steering input apparatus by using the steering angle of the steering input apparatus.

6. The steering assist apparatus according to claim 5, wherein
    the target differential angle control unit disables a detection of the input variation when the steering angle is within a predetermined steering angle range.

7. The steering assist apparatus according to claim 3, wherein
    the target differential angle control unit disables a detection of the input variation when a sign indicating a change direction of the turning angle of the steering apparatus and a sign indicating a change direction of the steering angle of the steering input apparatus are different from each other.

8. The steering assist apparatus according to claim 1, wherein
    the target differential angle control unit disables a detection of the input variation when the vehicle is determined, based on road information, as in a transition period between a turning state and a straight forward state.

9. The steering assist apparatus according to claim 1, wherein
    the steering assist apparatus further comprising a variable steering angle apparatus that generates a differential angle between the steering angle and the turning angle; and the target differential angle control unit transmits the determined target differential angle to the variable steering angle apparatus, thereby controlling the target differential angle.

10. The steering assist apparatus according to claim 1, wherein the steering assist apparatus further comprising a steering input apparatus drive unit that drives the steering input apparatus;

the steering input apparatus and the steering apparatus are not mechanically connected; and the target differential angle control unit controls the steering drive unit and the steering input apparatus drive unit, thereby controlling the target differential angle.

11. A method for controlling a steering assist of a vehicle provided with a steering input apparatus and a steering apparatus, the steering input apparatus and the steering apparatus performing a differential operation with a transmission ratio which is a ratio of a change amount of a steering angle to a change amount of a turning angle, the method comprising steps of:

determining a turning angle based on at least either a running state of the vehicle or road information;

determining a transition from a manual steering mode in which the steering apparatus operates in response to the steering angle inputted through the steering input apparatus to an automatic steering mode in which a steering drive unit is controlled to produce the determined turning angle; and determining a target differential angle to be close to an automatic steering target differential angle used for the automatic steering mode, when input variation through the steering input apparatus is not detected during a transition period from the manual steering mode to the automatic steering mode or during an elapsed period after completing the transition period; and controlling the differential angle to be the target differential angle.

* * * * *